Patented June 16, 1942

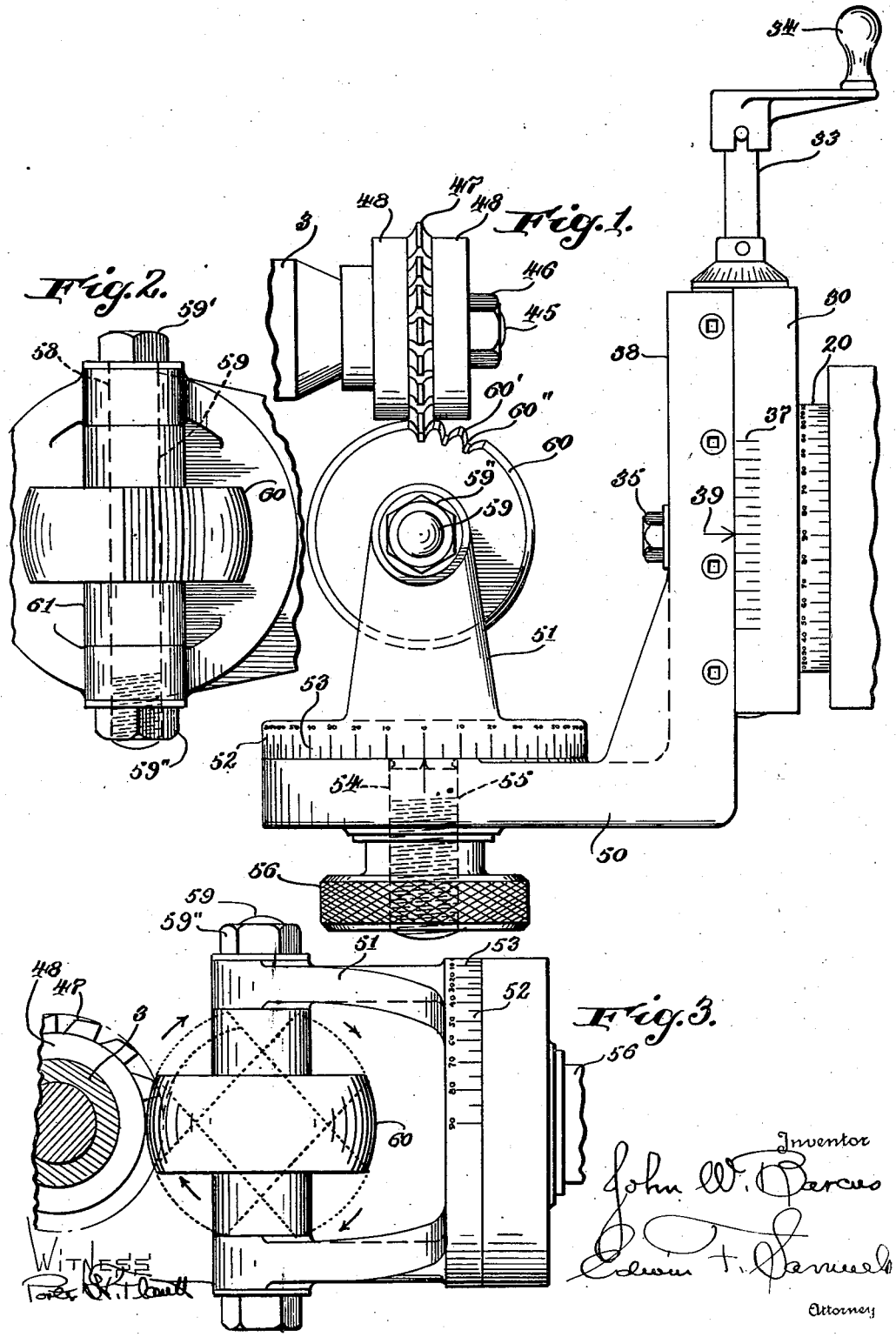

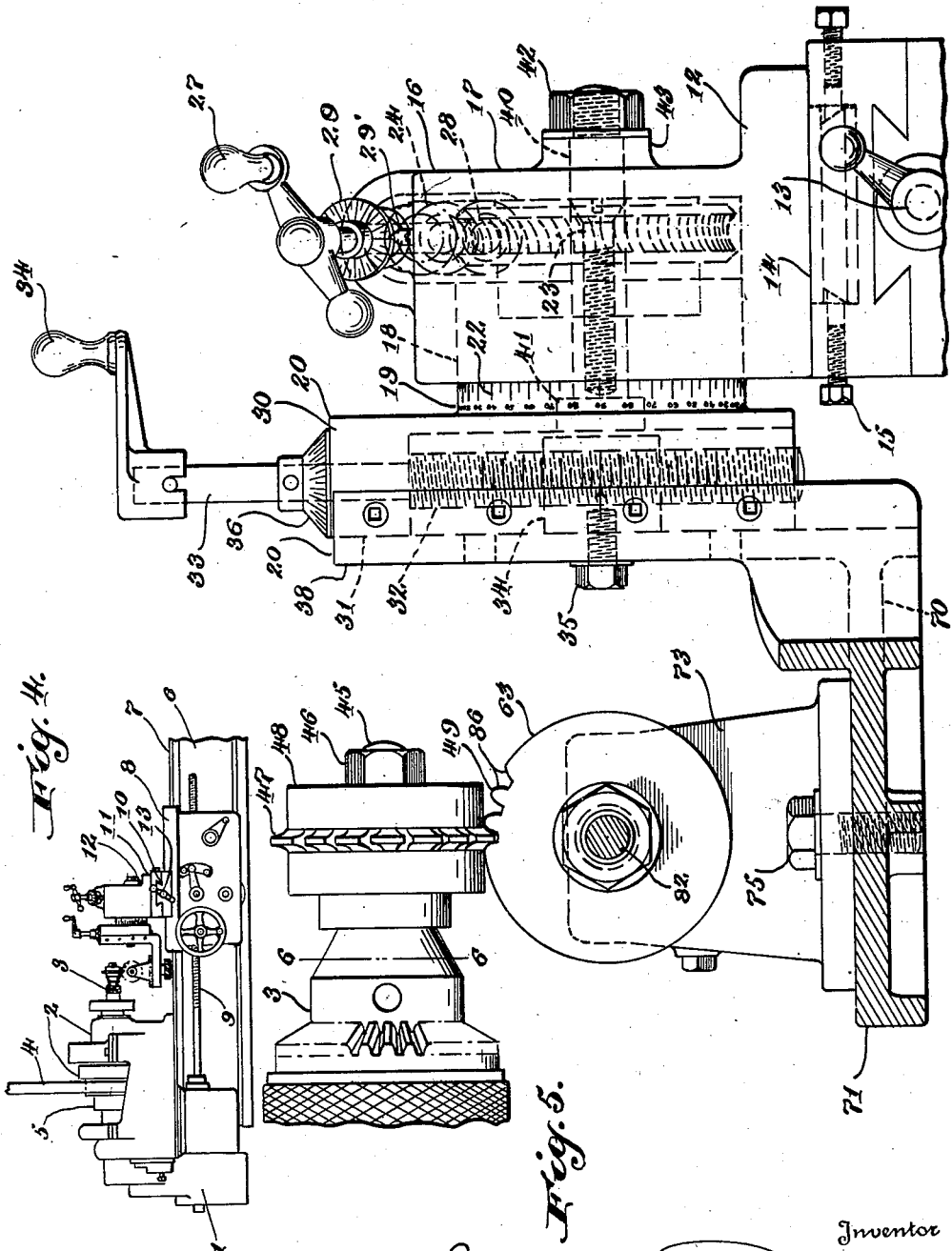

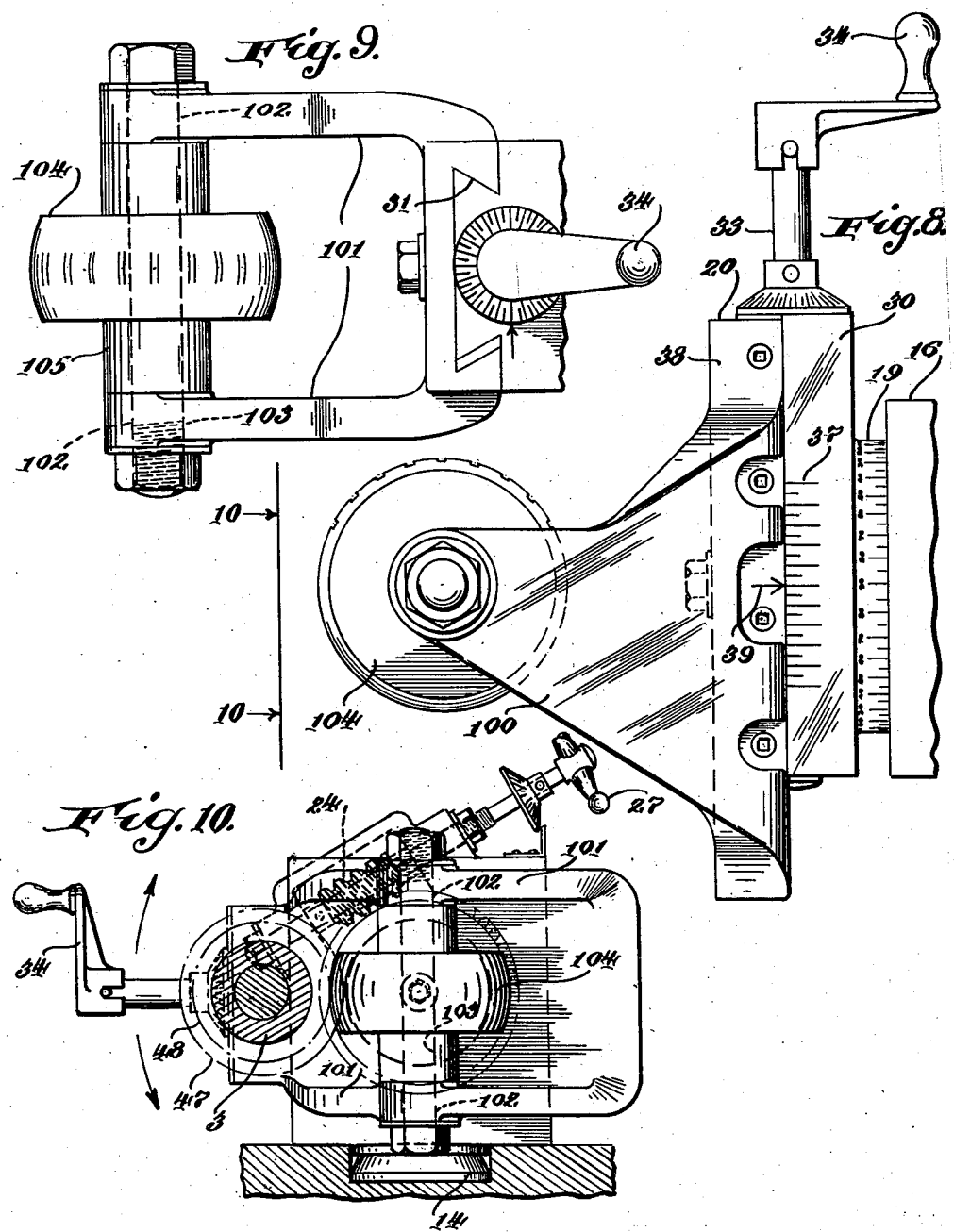

2,286,709

UNITED STATES PATENT OFFICE 2,286,709

GEAR CUTTING ATTACHMENT

John W. Barcus, Baltimore, Md., assignor to Baltimore Development Corporation, a corporation of Maryland Application March 15, 1937, Serial No. 131,002
Renewed March 19, 1940

6 Claims. (Cl. 90—9)

The invention relates to the cutting of toothed or spur gears. The device of the invention has the important advantage that, particularly for use as a lathe attachment, it can be constructed at a relatively low cost as compared to the cost of the usual gear-cutting machine and applied to any convenient type of lathe, whereby the lathe is adapted to gear-cutting; so that a small shop which would not ordinarily be equipped with a gear-cutting machine can, at a small expenditure for such an attachment, be equipped for the cutting of spherical and other gears.

Though the device of the invention is particularly adapted for use as a lathe attachment, the various features of the invention are also adapted to be embodied in a complete gear-cutting machine at an extremely moderate cost; and the invention has the important advantage that in either the form of a lathe attachment or as a separate machine it is adapted to cut practically all types of gears. While the attachment is devised with particular reference to the cutting of spherical gears, it is also adapted to cutting plain toothed or spur gears, helical gears, bevel gears, or miter gears, and spherical gears with helically arranged teeth.

In the accompanying drawings, I have illustrated a preferred form of the invention particularly adapted for use in the cutting of spherical gears but also adapted to be used in cutting plain gears, bevel gears, and helical gears, as well as a modified form particularly adapted to cutting plain gears and a further modified form adapted to cutting plain gears and gears of spherical shape, all the forms shown being adapted to perform the cutting operation as to spherical gears with more or less facility.

In the drawings:

Figure 1 is a plan view showing the lathe spindle fragmentarily, with a gear cutter thereon and the attachment of the invention in the preferred form in the position in which it is preferably arranged for cutting spherical gears with straight teeth, this attachment also being adapted to cutting plain and other types of spur or toothed gears as previously suggested.

Figure 2 is a fragmentary elevation of the workholder or blank-holding jaws with a spherical gear blank secured therein for cutting, the view being taken from the position of the cutter in Figure 1 and the carriage arm being broken away.

Figure 3 is a fragmentary elevation looking at the work-holding jaws and cutter from the right in Figure 1.

Figure 4 is a fragmentary elevation of a lathe bed including the head stock and spindle, with a gear cutter thereon, the lathe being equipped with the attachment shown in Figures 1, 2, and 3 arranged for cutting plain, spur, or toothed gears; i. e., from cylindrical blanks.

Figure 6:
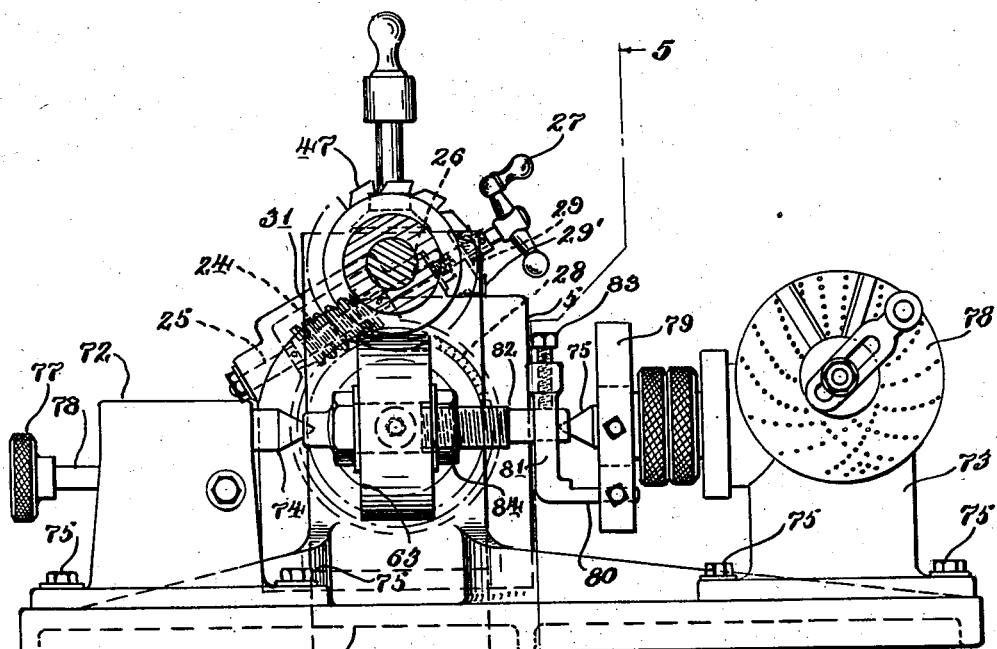

Figure 5 is an elevation of a slightly different form of gear-cutting apparatus or attachment shown in connection with a fragment of the lathe spindle, having a cutter thereon, and a fragment of the lathe carriage on which the attachment is mounted, the attachment being shown as arranged for cutting plain, spur, or toothed gears, and particularly constructed and adapted to this purpose, the cutter being in cutting relation to a blank operatively mounted on the attachment and the work-supporting arm being shown in section on line 5—5 in Fig. 6.

Figure 6 is an elevation of the attachment equipped with an index head for spacing the teeth, the same being taken from the left in Figure 5, and the lathe spindle being shown in section on the line 6—6 in Figure 5.

Figure 7:
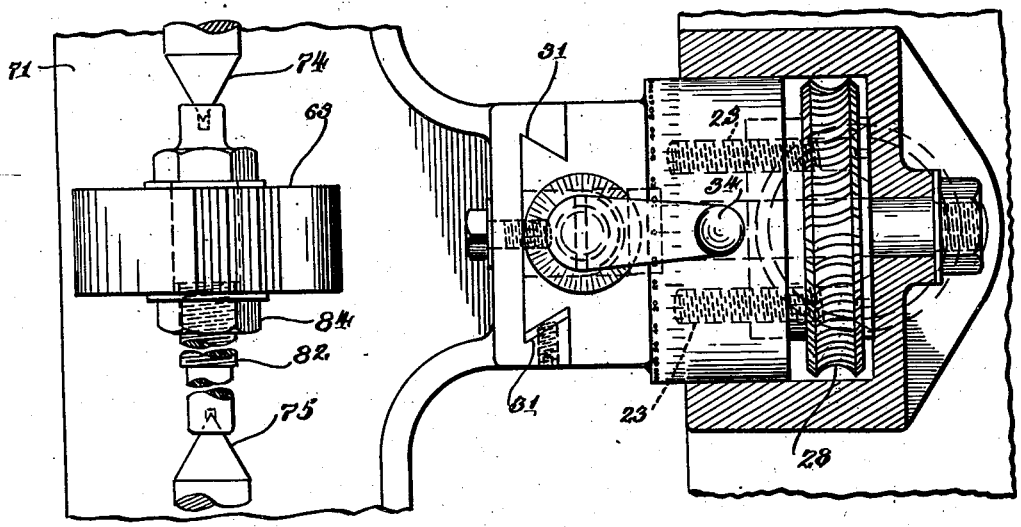

Figure 7 is a fragmentary plan of the construction shown in Figure 6, the ends of the work-support and the parts thereon, including the index head, being broken away and omitted.

Figure 8 is a plan view corresponding to Figure 1, showing fragmentarily still another form of attachment adapted either to the cutting of plain or spherical gears, bevel or miter gears, the arrangement shown being particularly adapted to the cutting of spherical gears; but with the parts adjusted to a position corresponding to Figure 5, it is adapted to the cutting of plain gears and, by still another adjustment, to be used in the cutting of bevel gears.

Figure 9 is an elevation of the same looking from the rear; i. e., from the crank side.

Figure 10 is an elevation of the same looking from the left in Figure 8 and taken from the plane 10—10 which intersects the lathe spindle, shown in section, the cutter being shown in elevation in operative engagement with a blank secured to the attachment. While the various constructions are shown in the form of lathe attachments, they may be built as a separate machine having a spindle and cross feed corresponding to the spindle and cross feed of the lathe.

Referring to the drawings by numerals, each of which is used to indicate the same or similar parts in the different figures, and having particular reference to Figure 4, the construction shown in said figure comprises a lathe 1 having a head 2 with a spindle 3 rotating about a horizontal axis and driven by a belt 4 or other suitable source of power, the belt being arranged to engage step pulleys 5. The illustration also includes a lathe bed 6 having horizontal ways 7 on which is mounted a carriage 8 operated by the lead screw 9 in the usual manner, the carriage being provided with the usual transverse ways 10 on which is mounted a carriage 11 which in the lathe serves as a tool carriage and in the use of this attachment serves as a work carriage to which an attachment base 12 is secured in place of the usual lathe tool post. The attachment base 12 may have, as shown in Figure 5, a depending projection 14 which appears in dotted lines. This is adapted to be secured in the tool post socket in any suitable manner, as by means of cap screws 15. The carriage 8 is also provided with the usual transverse feed screw 13 for feeding the work carriage 11 at right angles to the ways 7.

Having further reference to Figure 5, the gear-cutting attachment indicated in a general way by reference character 16 in the preferred form (it being understood that the attachment is capable of considerable variation for use as a lathe attachment and in the construction of a separate machine embodying these features) has an upright body 17 projecting upwardly from the base 12. This body 17, in order to provide for cutting spherical gears and the like, has a cylindrical bearing opening 18 in which is mounted the rotary work carriage head 19 which carries the work-holding carriage 20, which is shown in three different forms in the different figures of the drawings. These forms, as shown, are identical in that the body 17 and base 12 are operatively mounted with the axis of the head 19 parallel to the axis of the lathe spindle 3, and each head 19 is graduated at 22 and each body 17 is provided with a rotary adjusting and/or feeding worm 24 which cooperates with worm wheel 28 for rotating the head 19 and the work carriage 20 about the axis of the head 19.

The screw or worm 24 is mounted in suitable bearings in the body 17, as best shown at 25 and 26 in Figure 6, and the worm 24, which is provided with a hand crank 27, engages the worm wheel 28 secured to the rotary head 19 in any suitable manner. The worm 24 is provided with an index ring or circular plate 29 concentric therewith and cooperating with an index pointer 29' secured to the body 17 adjacent the periphery of plate 29.

The rotary carriage head 19 has secured thereto a carriage base 30 which is arranged transversely to the axis of the head 19 and is provided with ways 31 at right angles to said axis, as best shown in plan and Figure 7. These ways are arranged parallel to a diameter of the head 19 and spaced on each side of the same. On these ways is mounted the work-holding carriage 20 already identified.

Cooperating with the ways and parallel thereto is a carriage feed screw 32 mounted on a feed screw shaft 33 provided with a removable hand crank 34 for operating the feed. The screw, in turn, cooperates with a nut 34 connected to the carriage 20 in any suitable manner, as by means of a cap screw 35; and for fine adjustments the screw shaft 33 is provided with an index plate 36 which cooperates with a suitable pointer or vernier on the carriage base 30 not shown. The carriage base 30, as shown in Figures 1 and 8, is marked with a scale 37, and the tool carriage body 38 is provided with a cooperating pointer 39.

The drawing Figure 5 also shows a stud 40 in alinement with the axis of the rotary work carriage head 19, the stud 40 having at one end a head 41 seated in the rotary head 19 and a nut 42 at the other end bearing against a boss 43 projecting from the attachment body 17, the stud 40 being passed through the attachment body 17 and through the rotary head 19 whereby the head is adapted to be secured against accidental displacement from bearing 18. The worm wheel 28 is secured to the head 19 by screws 23.

The tool post carriage or base 11 is adjusted along the transverse ways of the lathe carriage 8 at right angles to spindle 3 by means of a screw 13, in accordance with the usual practice. This moves the work carriage 20 in the same direction as hereinafter described. The lathe spindle 3 is provided with an axially projecting stud 45 with a nut 46; and the cutter 47 (or hob if desired) is secured to the lathe spindle, being mounted on the spindle between collars 48 and secured by tightening the nut 46, the collars 48 being of suitable diameter relative to the cutter 47 to determine the depth of the groove or notch cut between the teeth of the gear being cut by contacting the end surfaces of the teeth at 49 when the groove or slot is completed.

As to all the features of the drawings so far described, the three different forms of the invention are, as illustrated, substantially identical though actually capable of considerable variation. They differ, however, in respect to the work-holding features of the work carriage 20 which are now to be described.

The construction in Figure 1 having been referred to as the preferred form, being particularly adapted to spherical gears, which is an important object of the invention, will be first described in detail as to the work-supporting portion of the bracket 20.

In this connection, it should be understood that the head 19 is provided mainly for use in cutting spherical gears and in cutting bevel or miter gears, and in adapting the apparatus for use on a lathe, so that it may be adjusted from one cutting position to the other.

Referring to Figure 1, which is a top plan view, it will be noted that the work-carriage 20 has been adjusted to middle position by means of the work-carriage feed screw 32 and has been turned to horizontal position, or substantially so, the head 19 and said carriage being rotated by means of worm 24 operated by crank 27. In this position, as hereinafter described, the center of the blank 60 is in line with the axis of head 19.

For convenience in distinguishing the different figures, it will be noted that Figure 5 is an elevation, work-carriage 20 and feed screw 32 being in vertical position.

Again having reference to Figure 1, the work carriage 20, or particularly the body 38 thereof, is provided at its end opposite to the crank 34 on the shaft 33 with a transverse work-supporting arm 50 on which the work-support shown in the form of work-holding jaws 51 is mounted. The jaws 51, as shown, are formed integrally with or secured to an index plate 52. This is necessary only in certain operations later referred to. As shown, it is graduated about its circumference at 53 and has at its center a depending stud 54 which passes through a suitable hole 55 in the transverse work-supporting arm 50. The stud 54, which is at right angles to the plate 52, is threaded at its end opposite the plate, and the plate 52 secured in adjusted position on the arm 50 by means of a thumb nut 56.

The work-holding jaws 51, which may be in the form of any suitable work support adapted to the purpose described, are provided with suitable bearings 58 (Figure 2) to support an arbor 59 on which the blank or work 60 is mounted and centered, being positioned by means of collars 61 at each side of the blank, various means for supporting and centering such blanks being well known and adapted for use in place of the device shown, and the work support 51 being capable of wide variation. The arbor 50, as shown, has a head 59' at one end, engaging the outside of one jaw at one side, the other end of the arbor being threaded to receive a nut 59" which bears against the outer surface of the opposite jaw at the other side.

In the operation of cutting spherical gears— the work carriage 20 having been first turned to horizontal position by rotating the head 19 with bearings 18 by means of worm 24 operated by crank 27—a blank which is represented at 60, the same being preferably in the form of the center or equitorial circumference of a sphere (a different section being chosen if desired) is clamped and centered on the arbor 50, supported between the jaws 59 or in any suitable manner to conform to the conditions presented, the work-holding device as in Figures 6 and 7 being adapted to this purpose except for the limitation as to space in some lathes.

An arrangement of the apparatus for cutting spherical gears is illustrated in plan in Figure 1, the work carriage 20 being adjusted by means of the screw 32 to a position in which the axis of the arbor 50 and the blank 60 are in a plane of the axis of the rotary head 19 but at right angles thereto and near the vertical, the index plate 52 with the jaws 51 being turned to a position determined by the index 53 to give this angular relation, and tightened by means of the nut 56.

The blank 60 having first been marked as to the positions of the teeth 60 to be cut, or a suitable index head being employed to position the blank for each groove 60" to be cut, the spindle 3 is driven in rotation and the blank turned to bring one of the notches or grooves 60" opposite the cutter 47; the blank is fed to cutting relation with the cutter by operation of the cross feed screw 13 of the lathe which, it will be noted, is parallel or substantially parallel at this time to the feed screw 32 of the bracket 20. The bracket 20 with the rotary bracket head 19, the work support, work etc., and all the moving parts are then rotated in the bearings 18 of the body 17 to pass the blank 60 in cutting relation to the cutter 47, the rotary motion described and the feed operation of the cross feed screw 13 being performed alternately, removing a small cut at each oscillation, until the notch or groove 60" is cut to the desired depth, which may be determined by contact of the blank with the outer peripheral surfaces of the collars 48 at each side of the cutter, the collars being preferably chosen of suitable size for this purpose. While it is at least theoretically possible to cut an entire groove 60" at each cut, the particular apparatus described is best adapted on account of the relative lightness of the parts to the removal of thin cuts, gradually cutting each groove 60" to the required depth. It is of importance to note that by the operation described the blank 60 is repeatedly rocked about its center line which is at right angles to the axis of arbor 59 and of blank 60, thus moving about said center line which is an axis of a sphere of which the blank is a section. Each said rocking motion passes the blank in cutting relation to the cutter, removing a relatively thin cut till the groove 60" is completed. While this groove might be formed by a single cut, this is not regarded as the best method of operating with this apparatus.

When the groove between the teeth has been cut to the desired depth, the blank including the work carriage 20 and the parts moving therewith is withdrawn by reverse operation of the cross feed screw 13; the nut 59" which holds the blank is slightly loosened; and the blank is turned so as to bring it to the next cutting position, either by a suitable index head or in conformance with marks thereon; and the cutting operation is repeated as to the next groove 60". When the cutting of the gear has been finished, all of the teeth being complete, the arbor 59 is removed and if a similar gear is to be cut a new blank is placed on the work-holder and cut in the manner described.

If a gear of different diameter is to be cut, there is no actual change of adjustment, the position of the centers of the work-holding jaws 51 being changed relatively to the spindle 3 and the arbor 47 by means of the cross feed screw 13 of the lathe, without changing the position of the center of the arbor 59 and hence the center of the blank relatively to the axis of head 19 about which it is rocked in cutting. It should be understood that the work carriage feed screw 32 is in the operation just described and in the position shown in Figure 1 parallel or substantially parallel to the lathe cross feed screw 13, i. e., in a horizontal position, the work carriage 20 and other parts including the screw 32 and the work-holder or work-holding jaws 51 being swung to and from and through this position at an angle corresponding to the width of the blank in making each cut.

To cut spherical gears of the helical type; i. e., having the teeth inclined to the axis of the gear, the work-holder or work-holding jaws 51 are rotated to a corresponding angle by loosening the nut 56 and tightening the same in the desired position of adjustment, the angle being indicated by the graduations 53 of the index plate 52. It is found that gears of short axial length or thickness can be cut with sufficient accuracy in this way.

Such clamping effect as is necessary to hold the blank 60 in any of these operations is obtained by tightening nut 59", the jaws 51 being slightly flexible.

The construction shown in Figures 1, 2, and 3 can also be used in the manner more fully described in connection with Figures 5, 6, and 7 for cutting plain, spur, or toothed gears; i. e., gears of the type which are made from a plain cylindrical blank, the tooth surfaces being parallel to the axis and to the surface of the cylinder.

In this operation, the work carriage 20 with the rotary carriage head 19 is turned about the bearing 18 in the body 17 to bring the feed screw 32 and the shaft 33 thereof into a vertical position; i. e., at right angles to the cross feed screw 13 as shown in Figure 4 which illustrates this attachment arranged on a lathe in position for cutting plain toothed gears and also in Figure 5 with a somewhat different form of work-holder. In this operation, after reaching this adjustment, the screw 32 is used to determine the thickness of each cut, the blank 63, see Figure 5, #63 being representative of any suitable cylindrical blank, being mounted as described in connection with the blank 60 but not necessarily centered with the head 19 as is the blank 60. The blank then being rotated to the desired cutting position is fed upwardly to determine the thickness of the cut by means of the screw 32 and transversely in cutting by means of the transverse feed screw 13 of the lathe.

The construction in Figure 1 may be further used to cut helical gears or gears with teeth inclined to the gear axis by turning the work-holder 51 to a suitable angle about the stud 54, the adjustment being maintained by tightening the nut 56 and, if desired, indicated by index 53.

By feeding the blank to the rotating cutter 47 by means of the transverse screw feed 13, the helical effect is obtained with a gear of short axial length.

For cutting beveled or mitered gears, a frusto-conical blank is substituted for the blank 60 (Figures 1, 2, and 3) and the carriage 20 is rotated about the axis of head 19 to a position in which the frusto-conical surface element, which represents the line of the first tooth slot or groove 60" to be cut, is parallel to the transverse feed screw 13. The cutting operation is then completed in the manner described for cutting plain toothed gears from cylindrical blanks.

Referring now to Figures 5, 6, and 7, Figure 5 having been already described, as to the elements which are common to the different embodiments of the invention illustrated; i. e., the L, or equivalent, shaped carriage 20, feed 32, carriage base 30, head 19 rocking on body 17, work-holder on the carriage arm, also spindle 3 and cross feed 13. It is noted that this Figure 5 is an elevation in which the body 38 of the L shaped work-carriage 20 is adjusted to vertical position about the axis of head 19. In Figure 1 the carriage 20 and particularly body 38 thereof, ways 31, and feed screw 32 are shown in horizontal position, the transverse work-supporting arm 70 at right angles to ways 31, as is the arm 50 in the previous figures, is provided with an elongated foot 71 which is particularly adapted to use in the cutting of gears other than spherical gears, as this elongated foot would tend to interfere with the ways 7 when the apparatus is used as a lathe attachment. The foot 71, is shown in section on line 5—5 (see (Figure 6). While this foot is elongated for convenience to support the equipment shown, it may be shortened for use in cutting spherical gears or it may be used for this purpose on a machine without ways 7 which serve no important function in connection with the present apparatus.

Referring again to Figures 6 and 7, the foot 71 is provided in this form of the invention with upright supports 72 and 73 for the alined centering pins 74 and 75, the upright supports 72 and 73 being secured to the foot 71 in any suitable manner, as by means of bolts or cap screws 75. The centering pin 74 is adjusted or moved in the direction of its axis, if desired, by means of a conventional adjustment operated in any suitable manner, as by means of the knurled head 77 on the shaft 78. The centering pin 79, as shown, is mounted in suitable bearings in the upright support 73 and may be rotated through any predetermined measured angle at the will of the operator by means of an index head 78 of a conventional type used in gear cutting, and the like. This is connected to the pin or shaft 75 in any suitable manner, such construction being known in the art. The pin or lathe center 75 has, in the form shown, secured thereto a face plate 79 suitably slotted or otherwise formed to receive the tail 80 of a dog 81 which is connected to the work-holding arbor 82 in any suitable manner, as by means of clamping screw 83. In operation, a gear blank 63 (in the present instance, a plain cylindrical blank) is mounted on the arbor 83 which may, if desired, be threaded to engage nuts 84 for securing the blank.

The arbor 82, being mounted between the centering pins 74—75, assumes the position illustrated in Figures 5, 6, and 7. In this operation, it is to be understood that the bracket 20 is adjusted by means of crank 27 operating worm 24 and worm wheel 28 about the axis of head 19, bringing the axis of the arbor to horizontal position, and the screw 32 is utilized to determine the thickness of the cuts. The cross feed screw 13 being operated to move the work, and the work-support and other parts carried by the carriage 11 passing the work or blank in cutting relation with cutter 47, said blank being moved by lead screw 13 in the direction of the axis of the arbor 82 and of the axis of the blank, and the blank being advanced by screw 32 after each reciprocation to give a new cut till the groove or slot between the teeth being cut is completed, when the blank is rotated by index head 78 to the desired position for cutting the next slot or groove 86, thus forming the teeth of the gear. The teeth are cut about the entire gear by the formation of these grooves in suitably and equally spaced relation about the blank in the manner previously described. The operation of the index head 78 for spacing the teeth or, more correctly, the slots or grooves between the teeth, being well understood in the art, need not be specifically described.

This construction may also be used in cutting bevel gears in the manner already described in connection with Figure 1 and, except for the possible difficulty in some lathe set-ups incident to swinging the elongated foot 71 on account of interference with other parts of the machine, it may be used in cutting spherical gears, the said operation being performed in the manner described in connection with Figure 1. No provision for cutting helical gears is shown in this connection.

Referring now particularly to Figures 8, 9, and 10, the illustration shows a rotary work-carriage head 19 with a work-carriage 20, carriage body member 38, and carriage base 30 with suitable ways as in Figures 1 to 7. Work-supporting arm 100 is of a form different from that of Figures 1 to 7, being particularly adapted for use in cutting spherical gears though it is capable of use in all the operations described except in the cutting of helical gears, the work-support or work-supporting jaws 101 having no adjustment in any way corresponding to the adjustment about the axis of the stud 54 and plate 52 as in Figure 1, which is likewise true of the construction in Figure 5, though such adjustment may be provided if desired.

Figure 8, which is a plan, shows the work carriage 20 including the bracket body 38 and bracket feed screw shaft 33 mounted for adjustment about the axis of the head 19 to any desired angle and for rocking about said axis in cutting spherical gears. It is shown in horizontal position. In this construction, the work-supporting arm 100 projects substantially from the center of the body 38 and, in the form shown, consists of two jaw members 101 having at their ends, or formed in their end portions, bearings 102 for a work-holding arbor 103 which supports the blank 104 between the jaw members 101, being spaced from said jaw members and suitably positioned by collars 105. The axis of the arbor 103 is in a plane at right angles to the axis of spindle 3 as in all other forms of the invention. Figure 1 also provides for adjustably swinging said arbor axis about stud 54, and in all instances the arbor is swung with carriage about the axis of head 19, though this head may be omitted for cutting plain gears.

Figure 10, which is a view looking from the left in Figure 8, shows the cutter 47 on the lathe spindle 3 in the same relation to the bracket base 38 and to the arbor 103, and hence to the work which it bears in Figure 1.

An important advantage of the structure in Figures 8, 9, and 10 is the reduction of the dimension of the carriage 20 in the direction of the radius of the gear blank which, in this instance, is indicated by reference character 104.

The illustration, Figures 8 and 10, shows the proper adjustment for cutting spherical blanks, the carriage 20 being adjusted by means of the screw 32 and crank 34 to a position in which the axis of the blank 104, which is also the axis of the arbor 103, is in a plane of the axis of the head 19, being at right angles to the axis of the head 19 so that the blank, assuming that it is spherical, can be cut in forming the teeth described in connection with Figure 1 by swinging in cutting relation with the cutter 47 by means of crank 27 and worm 24 and worm wheel 18. The entire attachment is moved to determine the thickness of the cut by the transverse feed screw 13. In obtaining the original adjustment, which is maintained throughout the cutting of spherical gears, the center of curvature of the blank, which is the center of the sphere, is first adjusted into alinement with the axis of head 19. This construction can be used either in the cutting of spherical gears or plain toothed gears as described in connection with Figure 5, or beveled gears, being however particularly adapted for use in connection with the cutting of spherical gears.

The construction of the invention has important advantages in that it provides for the equipment of a lathe at an exceedingly small cost whereby a lathe may be adapted for the cutting of gears, and it also provides for the construction at somewhat greater but still at a relatively small cost of a simple type of gear-cutting machine as compared to the available gear-cutting and milling machines. The equipment of a lathe for this operation is of great importance in that it enables small shops which would not ordinarily be equipped with gear-cutting appliances to cut gears as required, particularly in the construction of special machines. And it is also of importance that the invention provides, at the small cost referred to, a machine adapted to the cutting of spherical gears, which is an operation that has generally been regarded as presenting problems which, if they could be solved at all, could only be met by the most expensive apparatus.

I have thus described a preferred and various modified forms of gear-cutting apparatus embodying my invention; the same being particularly adapted for application to a lathe though capable of more general application, the description of these various forms being specific and in detail in order that the manner of constructing, applying, operating, and using the invention in these various forms which I have described as examples of the application of the invention may be fully understood; however, the specific terms herein are used descriptively rather than in a limiting sense, the scope of the invention being defined in the claims.

What I claim as new and desire to secure by Letters Patent is:

1. A gear-cutting appliance comprising a rotary spindle adapted to support a cutter mounted thereon, a rotary head and means adapted to support the same with its axis parallel to the spindle axis, means for feeding the rotary head transversely to the spindle axis, a work support mounted on said rotary head, means for adjusting and feeding said work support transversely to the axis of said head and said first mentioned feed, a work-holding device on said work support, said work-holding device being mounted for rotation and adjustment about an axis at right angles to the axis of the rotary head and substantially parallel to said feed which is transverse to the head axis, said work support having means for supporting a gear blank arbor with its axis at right angles to the axis of the head and which arbor in one position of said feeds has its axis diametrically related as to the axis of said head, providing for the rotation of the work and said arbor about the axis of the head in cutting relation with the cutter, the axis of the arbor and gear rotating in a plane at right angles to the axis of the head.

2. A gear-cutting attachment for a lathe, having a rotating spindle adapted to have a rotary gear-cutting tool mounted thereon, and a lathe carriage, a second carriage thereon with ways therefor at right angles to said spindle, and means for moving the latter carriage along the ways, said attachment comprising a rotary head mounted on said latter carriage and adapted to be arranged with its axis parallel to said spindle and means for supporting a gear blank holding arbor on said head with its axis at right angles to said spindle, the blank on said arbor being symmetrical with the head axis, and means carried by the head for adjusting the arbor support radially of said head and means for rotating the head to apply a rotary feed to the blank, rotating it in cutting relation to the cutter in a plane of its axis substantially parallel to the plane of rotation of the cutter.

3. A gear-cutting attachment for a lathe having a rotating spindle and a gear cutter mounted thereon, a lathe carriage, said lathe carriage having means for receiving a work support, said support receiving means being pivoted on said lathe carriage on an axis parallel to said spindle, a work support mounted on said means, an arbor on said work support extending transversely of said spindle for holding a gear blank, said gear blank receivable upon said arbor in a plane passing substantially through the said pivot, operating means for rotating said support receiving means about said pivot for moving the said gear blank in and out of cutting relation to said cutter.

4. A gear-cutting attachment for a lathe having a rotating spindle and a gear cutter mounted thereon, a lathe carriage, said lathe carriage having means for receiving a work support, said support receiving means being pivoted on said lathe carriage on an axis parallel to said spindle and slidably adjustable perpendicular thereto, a work support mounted on said means, an arbor on said work support extending transversely of said spindle for holding a gear blank, said gear blank receivable upon said arbor in a plane passing substantially through the said pivot, operating means for rotating said support receiving means about said pivot for moving the said gear blank in and out of cutting relation to said cutter.

5. In combination, a rotary cutting tool, a rotary head having its axis parallel to the axis of said cutting tool and movable parallel therewith, means for feeding said rotary head at right angles to said cutting tool axis, a work support carried by said rotary head, means for securing a blank on said work support with its center in the axis of said rotary head, and means for rotating said head to bring portions of the blank into contact with said cutting tool.

6. In combination, a rotary cutting tool, a rotary head having its axis parallel to the axis of said cutting tool and movable parallel therewith, means for feeding said rotary head at right angles to said cutting tool axis, a work support carried by said rotary head, means for securing a blank on said work support with its center in the axis of said rotary head, and means associated with said head for rotating the latter during the cutting operation whereby portions of the blank will be moved in contact with said cutter progressively in an arc from the axis of said head.

JOHN W. BARCUS.